United States Patent
Errington et al.

(10) Patent No.: US 7,563,830 B2
(45) Date of Patent: Jul. 21, 2009

(54) METHOD FOR THE PRODUCTION OF BIODEGRADABLE FOAMED PRODUCTS

(75) Inventors: John Gough Errington, Christchurch (NZ); Anya Jane Hornsey, Christchurch (NZ); Timothy James Chapman, Christchurch (NZ); Maria Louise Hastings, Christchurch (NZ); Philip James Quinn, Christchurch (NZ)

(73) Assignee: Novamont S.p.A., Novara (IT)

( * ) Notice: Subject to any disclaimer, the term of this patent is extended or adjusted under 35 U.S.C. 154(b) by 0 days.

(21) Appl. No.: 10/343,625

(22) PCT Filed: Apr. 6, 2001

(86) PCT No.: PCT/NZ01/00052

§ 371 (c)(1),
(2), (4) Date: Feb. 3, 2003

(87) PCT Pub. No.: WO02/14043

PCT Pub. Date: Feb. 21, 2002

(65) Prior Publication Data

US 2004/0092613 A1    May 13, 2004

(30) Foreign Application Priority Data

Aug. 14, 2000   (NZ) .................................. 506328

(51) Int. Cl.
*B29C 35/08* (2006.01)
*B29B 11/10* (2006.01)

(52) U.S. Cl. ..................... 521/79; 521/82; 521/84.1

(58) Field of Classification Search .................. 521/79, 521/82, 84.1; 264/417
See application file for complete search history.

(56) References Cited

U.S. PATENT DOCUMENTS

| | | | |
|---|---|---|---|
| 5,095,054 A | 3/1992 | Lay et al. | |
| 5,639,518 A | 6/1997 | Ando et al. | |
| 5,730,824 A | 3/1998 | Spence et al. | |
| 5,766,749 A | 6/1998 | Kakinoki et al. | |
| 5,801,207 A | 9/1998 | Bastioli et al. | |
| 5,939,192 A * | 8/1999 | Rettenbacher et al. | 428/401 |
| 6,168,857 B1 | 1/2001 | Anderson et al. | |

FOREIGN PATENT DOCUMENTS

| | | |
|---|---|---|
| JP | 07255385 A * | 10/1995 |
| WO | WO 95/07693 | 3/1995 |
| WO | WO 98/08642 | 3/1998 |
| WO | WO 98/51466 | 11/1998 |

OTHER PUBLICATIONS

English language abstract of Japanese Application No. 1997-229333 file Aug. 26, 1997; Published May 11, 1999 on www.delphion.com.

* cited by examiner

*Primary Examiner*—Irina S Zemel
(74) *Attorney, Agent, or Firm*—Connolly Bove Lodge & Hutz LLP (57) ABSTRACT

A method for the production of a biodegradable foamed product 7 from a base material and a blowing agent 1. The base materials are mixed with a blowing agent and any other required additives 1. The mixture 3, after extrusion 2, is placed in a microwave transparent mold 6 and processed in a microwave via distinct steps. The first step preheats the extrudate to a temperature just below the flash point 6. The second step 7 rapidly heats the extrudate beyond the flash point causing the extrudate to foam in the mold 7. By utilizing this method it is possible to produce shaped articles with uniform properties and with packaging properties such as compressibility, resilience and shock absorption.

11 Claims, 5 Drawing Sheets

METHOD FOR THE PRODUCTION OF BIODEGRADABLE FOAMED PRODUCTS

BACKGROUND

The present invention relates to the method for manufacturing biodegradable molded products. More particularly, the present invention relates to having a matrix based on starch, or materials with similar rheological properties, foamed for use in molded products. In particular, the method involves two or more distinctive steps during microwave processing, giving a product with improved packaging properties including resilience, compressibility and shock absorption.

The area of starch based biodegradable foamed materials is widely discussed in the prior art. In particular, U.S. Pat. No. 6,168,857 has a detailed discussion that may be referenced in relation to this patent.

Containers and Packaging

Articles such as sheets, films and packaging molds made from materials such as paper, paperboard, plastic, polystyrene, and even metals are used in enormous quantity. This can take the form of printed materials, mats, containers, separators, dividers, envelopes, lids, tops, cans, and other packaging materials. Advanced processing and packaging techniques presently allow an enormous variety of liquid and solid goods to be stored, packaged, or shipped while being protected from harmful elements.

Containers and other packaging materials protect goods from environmental influences and distribution damage, particularly from chemical and physical influences. Packaging helps protect an enormous variety of goods from gases, moisture, light, micro-organisms, vermin, physical shock, crushing forces, vibration, leaking, or spilling.

For the purposes of the discussion, many prior art products and processes are seen as not being environmentally friendly. Wherein for the purposes of the present invention, "environmentally friendly" may be characterized as:

Being produced from substantially naturally occurring and renewable, raw materials;
Manufactured in such a way as to cause minimal deterioration to the environment for example via low energy processing and low emission methods;
Producing a product that is biodegradable and not harmful to the environment; and
Production whereby the whole process is sustainable.

However it is not intended that this definition be seen as limiting.

The Impact of Traditional Materials

Recently there has been a debate as to which of these materials (e.g., paper, paperboard, plastic, polystyrene, glass, or metal) is most damaging to the environment. Paper, paperboard, plastic, polystyrene, glass, and metal materials each have unique environmental issues that do not meet the definition of "environmentally friendly". These issues can relate to the biodegradability of the material itself or the method of production, for example, high energy use, damaging by-products and emissions.

Another problem with paper, paperboard, polystyrene, and plastic is that each of these requires relatively expensive organic starting materials, some of which are non-renewable, such as the use of petroleum in the manufacture of polystyrene and plastic. Although trees used in making paper and paperboard are renewable in the strict sense of the word, their large land requirements and rapid depletion in certain areas of the world undermines this notion. Hence, the use of huge amounts of essentially non-renewable starting materials in making sheets and articles therefrom cannot be sustained and is not wise from a long-term perspective.

Starch Based Foams

Recent uses of starches and starch derivatives as the binding agent or sole constituent within molded articles are known. U.S. Pat. No. 5,095,054 is the parent document for this style of product. The parent patent, and the patents citing this patent, recognize the fact that starch can be foamed and molded by means of forming what is known in the art as "destructurized starch". In the manufacture of destructurized starch, native starch or starch derivatives are mixed with a wide variety of additives such as plasticizers, and heated, solidified and cooled, typically into a mold.

EP-707034 and WO95/07693 both use conventional thermal conductive heating processes that do not lend themselves to the production of thick-walled moldings. Non-homogenous heating occurs when the heating process is reliant on heat conduction as it is difficult to heat the core of the material to the same extent as the exterior. This results in non-uniform foam properties, which is undesirable in protective packaging used for cushioning applications.

A further example includes U.S. Pat. No. 6,168,857 in which the process is only usable in thin walled applications. Thin walled articles are of limited use in terms of protective packaging used for cushioning applications. Thick walled articles are needed where shock absorption properties are required. The method of fashioning articles from sheets used in U.S. Pat. No. 6,168,857 does not allow for the forming of thick sheets.

Another U.S. Pat. No. 5,730,824 utilizes extrusion to produce foam panels. These panels are then laminated together to form thick sheets, which can be wire cut to varying size shapes. There are limitations in this process due to the expensive capital equipment required for manufacturing. As a result of the expensive equipment, the method necessitates shipping 'air' as the product can only be made in central locations. In addition the shapes are either very limited or costly because they have to be cut out of sheets instead of molded during the foaming process.

Another example, U.S. Pat. No. 5,801,207, relates to taking foamed starch pieces, placing them in a bag or within layers of sheeting and molding the pre-expanded peanuts into solid foam-in-place molds. The limitations are that the foamed peanuts used to make the molds are very bulky and take up a lot of store space, and again increase expense through having to ship air to the point of use instead of sending dense pellets that can be foamed at point of use. The method is also a complicated procedure for the end-user, as they have to fill and seal bags of foamed peanuts and then mold the bag to the product shape.

Two further patents, WO 9/851,466 and U.S. Pat. No. 5,639,518, utilize dielectric heating in processing the starch based materials.

In WO 9,851,466, the dielectric heating proceeds in one step and does not take into account the changing dielectric properties of the material as it heats, nor the relationship between the rheological properties (for example elasticity and viscosity) and the rate of heating. This results in the material not being heated as rapidly and intensely, thus lowering the potential foaming and product resilience.

U.S. Pat. No. 5,639,518 again does not utilize different steps during processing to take account of the changing dielectric rheological properties of the material as it heats up. Two stages are outlined relating to changes in the microwave frequency from low frequency and then high frequency but not with any reference to varying material properties and a rate of heating profile. This frequency change results in a significant increase in processing expense due to more specialized equipment being required.

In addition, the methods described above often produce foams with varying consistency depending on the shape required and often without the combination of uniform physical and mechanical properties. These properties include density, compressibility, resilience and shock absorption. All of these properties limit the product applications.

A further method for molding starch-based mixtures into articles involves batch-molding an aqueous starch mixture between heated dies. The starch binder is preferably initially in an unmodified, un-gelatinized state within the moldable aqueous mixture. The starch/water mixtures are heated between the molds to a temperature great enough to gelatinize the starch as well as to remove the majority of the water from the moldable mixture. The resulting molded articles can be de-molded, but are initially very brittle until they have been "conditioned" by placing them in a high humidity chamber for extended periods of time in order to reabsorb moisture. While the foregoing batch molding process may have some utility, it does not allow for continuous manufacturing and as such is expensive to run.

Based on the above, there is a perceived difficulty in finding improved methods for manufacturing low cost and environmentally friendly products, which have properties similar to paper, paperboard, polystyrene, or plastic, but are biodegradable and resilient.

An object of the present invention is the provision of the method to produce a foamed product with uniform physical and mechanical properties such as density, compressibility, resilience and shock absorption.

A further object is the provision of a method and product, which overcome some, or all of the above described disadvantages of existing biodegradable foamed products.

Another object is the production of a biodegradable foamed product and method, which provides the public with a useful alternative to existing methods and products.

Further aspects of the present invention will become apparent from the ensuing description which is given by way of example only.

SUMMARY

According to one aspect of the present invention there is provided a method of producing a biodegradable foamed product, the method including the steps of:
a. selecting at least one base material;
b. blending the base material with at least one additive to form a mixture;
c. extruding the mixture in the presence of water;
d. transferring the extrudate to a mold;
e. heating the extrudate using dielectric heating, characterized by the steps of;
f. preheating the extrudate to below the flash point of the blowing agent to achieve a uniform temperature distribution throughout the extrudate;
g. rapid heating of the extrudate through the flash point of the blowing agent thereby forming an expanded foamed product.

It is the understanding of the applicant that the advantages of this method of introducing energy are based on the fact that with dielectric heating it is possible to realize very high power densities. In addition, the energy acts on the starch material not merely at the surface, but also penetrates into the starch material, allowing rapid internal heating of the material, which results in the flashing off of the blowing agent. Uniform cell structure is achieved through the optimization of microwave application such that a uniform electric field is generated within the material.

It is understood by the applicant that the bubble growth is a function of the amount of energy delivered to the blowing agent and of the rheological properties of the material. The viscoelasticity of the material must be such that it can allow the build up of water vapor pressure without rupture or severe shrinkage.

In the preferred embodiment, dielectric heating is used for heating the product as it has been found in practice to provide the most even heating and also the required intensity.

According to a further aspect of the present invention there is provided a method of producing a biodegradable foamed product, the method including the steps of:
a. selecting at least one base material;
b. blending the base material with at least one additive to form a mixture;
c. extruding the mixture in the presence of water;
d. transferring the extrudate to a mold;
e. heating the extrudate using dielectric heating, characterized by the steps of;
f. preheating the extrudate to below the flash point of the blowing agent to achieve a uniform temperature distribution throughout the extrudate;
g. rapid heating of the extrudate through the flash point of the blowing agent thereby forming an expanded foamed product; wherein, the force of the water vapor pressure is higher than the viscous forces of the material.

If the viscosity of the extrudate melt is too low, no water vapor pressure will build up as the material will offer no resistance against which the water vapor pressure can build.

According to a further aspect of the present invention there is provided a method of producing a biodegradable foamed product, the method including the steps of:
a. selecting at least one base material;
b. blending the base material with at least one additive to form a mixture;
c. extruding the mixture in the presence of water;
d. transferring the extrudate to a mold;
e. heating the extrudate using dielectric heating, characterized by the steps of;
f. preheating the extrudate to below the flash point of the blowing agent to achieve a uniform temperature distribution throughout the extrudate;
g. rapid heating of the extrudate through the flash point of the blowing agent thereby forming an expanded foam product; wherein, the elasticity of the material is such that it is high enough to prevent the blowing agent vapor rupturing the extrudate and low enough to prevent severe shrinking.

If the elasticity is too low during step (g), the water vapor pressure will rupture the extrudate causing a weak open cell structure to be formed. Alternatively, if the elasticity at step (g) is too high, the material will shrink before the structure is able to solidify causing a very high density and hard foam to be formed.

It is the understanding of the applicant that viscosity and elasticity are both functions of a large number of variables including temperature, water content, molecular structure (influenced by the level of molecular degradation), plasticizer content, additive content for example viscosity modifiers and starch gelatinization.

In tests completed on the material processed using the above method, it has been found that the level of molecular degradation influences the foam success (as indicated by water solubility index, WSI).

Where the level of macromolecular degradation in the pellets is low the foam produced is of high density and is hard and brittle.

Where the level of macromolecular degradation in the pellets is high the foam produced is of low density but is soft, brittle and has an open cell structure.

Where the level of macromolecular degradation in the pellets is medium the foam produced is of medium density, closed cell structure and is soft and resilient.

Those skilled in the art will appreciate that a correlation therefore exists between viscosity and elasticity of the base material and the level of molecular degradation.

According to a further aspect of the present invention, the microwave equipment is adjusted such that maximum heating (incorporating power density) is rapidly delivered to the material in stage (g). In a further embodiment, in stage (g) described above, one or more re-tuning steps may be effected depending on the dielectric property changes of the extrudate. Alternatively, separate microwave generators, differently tuned, are used in place of the re-tuning steps.

Varying the intensity of thermal energy also regulates the foaming success.

Where the microwave duty cycle is set at 100% and the rate of heating is the highest the foam success is greatest.

Where the microwave duty cycle is set at 50% and the rate of heating is the lowest the foam success is lowest.

Where the microwave duty cycle is set at 70% and the rate of heating is intermediate the foam success is between that achieved at 100% duty cycle and 50% duty cycle.

In the case of the present invention, it is understood by the applicant that the foam formation involves the nucleation and growth of water vapor bubbles as the result of rapid heating.

The applicant has found that the more rapid the heating is, the better the foam success, however it will be appreciated by a person skilled in the art that there is an upper limit after which foam success deteriorates. Foam success is measured based on the characteristics of successful packaging foams. These include density, compressibility, resiliency and particle adhesion but it is the combination of these properties that ultimately determines the functionality of the foam. The quantity 'foam success' is used in the application to quantify the overall functionality of the foam.

Hence, given the relationship between viscosity, elasticity and rapid heating, in the preferred embodiment, between step (f) and step (g), the microwave equipment is re-tuned.

In addition to the changes in the viscosity and elasticity, the dielectric properties of the extrudate change considerably between room temperature and around 80-99° C. (just below the flash point). It has been found that by re-tuning the microwave equipment, it is re-matched to the different dielectric properties of the material at the end of the preheat phase.

With the equipment/material matching improved, higher power densities can be achieved and the rate of heating can be optimized in the critical heating region i.e. around 90-130° C. where the foaming occurs i.e. in step (g). More accurate power density profiles can also be achieved through re-tuning.

For the purposes of the explanation two stages (f) and (g) have been used for an example of the dielectric heating method. This should not be seen as limiting, as further stages are possible before and after reaching the material flash point.

In the preferred embodiment, the microwave radiation is within the standard microwave frequency range 915 MHz to 25 GHz. Preferably, the radiation is in the range easily reached for microwave equipment of 2.0 GHz to 3.0 GHz, more preferably in the standard range for microwave equipment of 2.40 to 2.50 GHz. According to a further aspect of the present invention, the operating frequency of the microwave is held approximately constant during processing. In addition, a power density distribution in the range of 0.01 W/cc to 10.00 W/cc is used. More preferably the power density is greater than 3.5 W/cc.

In a further embodiment, during microwave treatment, the power output of the microwave is varied depending on the desired product characteristics required. Varying the duty cycle of the microwave source is a commonly used means of controlling the effective power output. Alternatively, if more than one microwave generator is used, they may be at different power ratings.

In the above described method, the base material at step (a) is selected from the group consisting of: proteins, starches including cereal, root and tuber starches, modified starches, food residues, biodegradable polymers, and any combination thereof. It can also include materials where the material has rheological properties that are similar to those of starch materials.

In the preferred embodiment, the preferred blowing agent is water. It is understood by the applicant that successful foaming comes from rapid heating, which causes a 'flash-off' of the agent. In the case of water, if the rate of heating is too slow, then the rate of vapor transfer will be higher than rate of heating. This means the water will evaporate, causing no build up in water vapor pressure and hence no water vapor bubbles form or grow to create the 'cells' necessary for a uniform foamed product.

The present invention also provides a method as described above in which the further additives include a blowing agent other than water.

In a preferred embodiment, a solid blowing agent is added at step (b). Alternatively a liquid blowing agent is added at either step (b) or step (c). The process is not limited to only occur as the result of the change of state of the blowing agent from a liquid into the gaseous phase. There are other mechanisms for foam formation including the thermal degradation of solids to form gases e.g. sublimation or thermally initiated chemical reactions, which produce gases. In a preferred embodiment these gases act as blowing agents.

Other additives can also be included. Typically these additives are selected from a range of biodegradable plasticizers (such as polyvinyl alcohol with various hydrolysis degrees), nucleating agents (such as magnesium silicate, calcium carbonate), processing aids (such as lecithin, mono-glycerides) and any combination thereof.

Further additives with an application dependent function can also be included such as flame retardants, fungus and mold inhibitors, strength adjusting additives, adhesion promoters, viscosity modifiers, fillers and rodent repellents.

According to a further aspect of the present invention, in the above described method, the moisture content, during extrusion, ranges between 10% by weight and 50% by weight. Preferably the range is from 15% to 30% by weight as this has been found to give the best foaming success in trials. These weight ranges are based upon the total weight of the raw material starting mixture before the microwave heating thereof.

A further option for processing includes a conditioning step following extrusion. The extrudate is conditioned to a pre-determined moisture content via temperature and humidity control. The moisture content is in the range from 5% to 20% by weight as this has been found to give the best foaming success in trials.

According to a further aspect of the present invention, there is provided an intermediate product after a conditioning step, substantially as described above. In the applicant's experience, the conditioned extrudate is a useful intermediate product that is compact and yet in a form ready for use in foaming operations.

During steps (f) and (g), the extrudate is heated dielectrically using molds to hold the extrudate. The mold container is either completely microwave transparent; largely microwave transparent; and combinations thereof, taking into account the increase in volume of the material, and the fact that the water vapor and air needs to be expelled from the mold unhindered at the same time.

A further advantage of the present invention is the low set-up and running cost. The method utilizes equipment generally well known and utilizes, for example extruders and microwave ovens. Similarly, the materials can be shipped prior to foaming, thus keeping freight costs lower due to the smaller volumes shipped. The customer can then microwave and foam the material thus improving the process efficiency i.e. not paying to ship 'air' in the expanded product and spreading the capital equipment cost.

According to another aspect of the present invention, there is provided a biodegradable foamed product produced by any one of the above described methods.

According to another aspect of the present invention, there is provided a product produced after step (c).

BRIEF DESCRIPTION OF THE DRAWINGS

Further aspects of the present invention will become apparent from the following description, which is given by way of example only and with reference to the accompanying drawings in which.

DETAILED DESCRIPTION

The invention will now be further described with reference to more detailed examples.

Preparation

Figure 1:
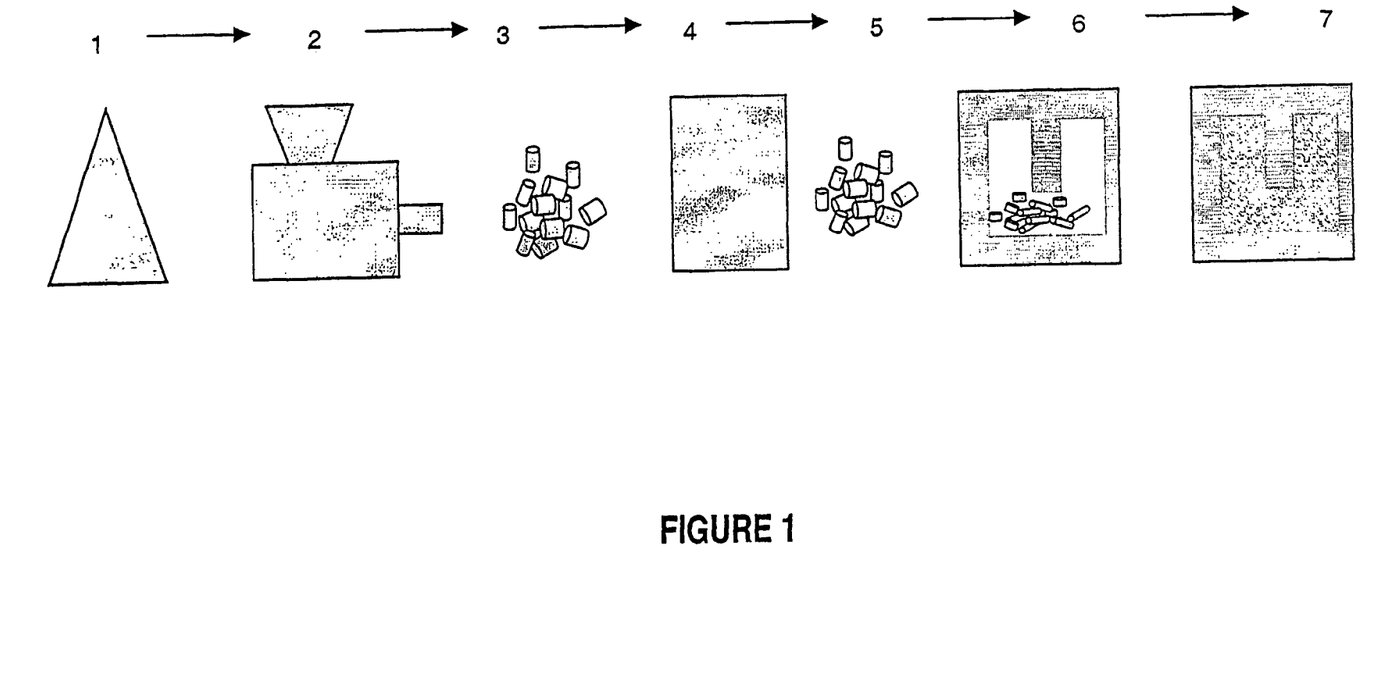
FIG. 1 is a flow diagram of the process according to a preferred embodiment of the present invention.

Referring to FIG. 1, the method starts with a blend of a starch (as the base material) and other substances mixed together to form a blend (1).

An example of a base material blend termed 'A2' for the example, includes:

| Material | Proportion [% Dry weight] |
| --- | --- |
| Tapioca Starch | 81.25 |
| Maltodextrin (dextrose equivalent 8-12) | 2.5 |
| Pregelatinzed modified waxy maize starch | 3.00 |

-continued

| Material | Proportion [% Dry weight] |
| --- | --- |
| Polyvinyl alcohol (degree of hydrolysis = 86-89 mole %) | 12.00 |
| Magnesium Silicate | 0.25 |
| Lecithin | 1.00 |

However, it will be appreciated that other biodegradable polymers can be used as the base material, provided the rheological properties of the material is similar to those of starch pellets.

The blend (1) is extruded in an extruder (2) of known type at a moisture content of 15% to 30% by weight to achieve an extrudate with the desired rheological properties (3). Such an extruder is, for example, one with a single screw.

The extrudate (3) is cut into pellets or long rods or rolled into final mold ready shapes. The extrudate is conditioned (4) to a moisture content in the range of 12% to 16% by weight at a temperature of 15° C. to 40° C. This occurs in 25% to 80% relative humidity in a controlled climate container (4) to minimize case hardening of the extrudate (3). This gives a shelf stable and easily transported product, which can be stored for later use (5).

It will be appreciated by those skilled in the art that other shapes may also be achieved, for example plain or patterned sheets.

The conditioned extrudate (5) is loaded into a microwave-transparent mold in the shape required. For this example, 70 g of extrudate (5) is loaded into an 18 cm×8 cm×4 cm container (6).

EXAMPLE 1

The level of molecular degradation is measured against the foam success (as indicated by water solubility index, WSI).

Figure 2:
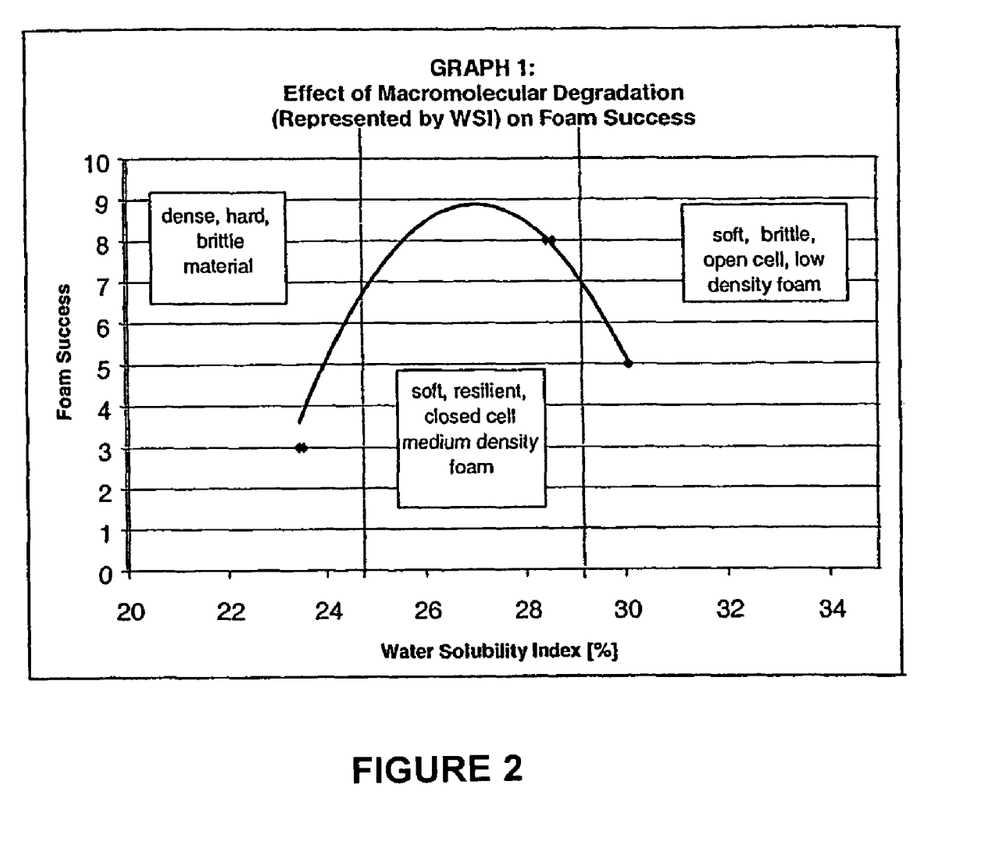
FIG. 2 is a graph showing the relationship between foam success and water solubility index.

Samples prepared as above are tested, giving the results as shown in FIG. 2.

Where the level of macromolecular degradation in the pellets was low (region A on FIG. 2), the foam produced was of high density and was hard and brittle.

Where the level of macromolecular degradation in the pellets was high (region C on FIG. 2), the foam produced was of low density but was soft, brittle and had an open cell structure.

Where the level of macromolecular degradation in the pellets was medium (region B on FIG. 2) the foam produced was of medium density, closed cell structure and was soft and resilient.

Those skilled in the art will appreciate that a correlation therefore exists between viscosity and elasticity of the base material and the level of molecular degradation.

EXAMPLE 2

The level of foam success is measured against variations in intensity of thermal energy.

Figure 3:
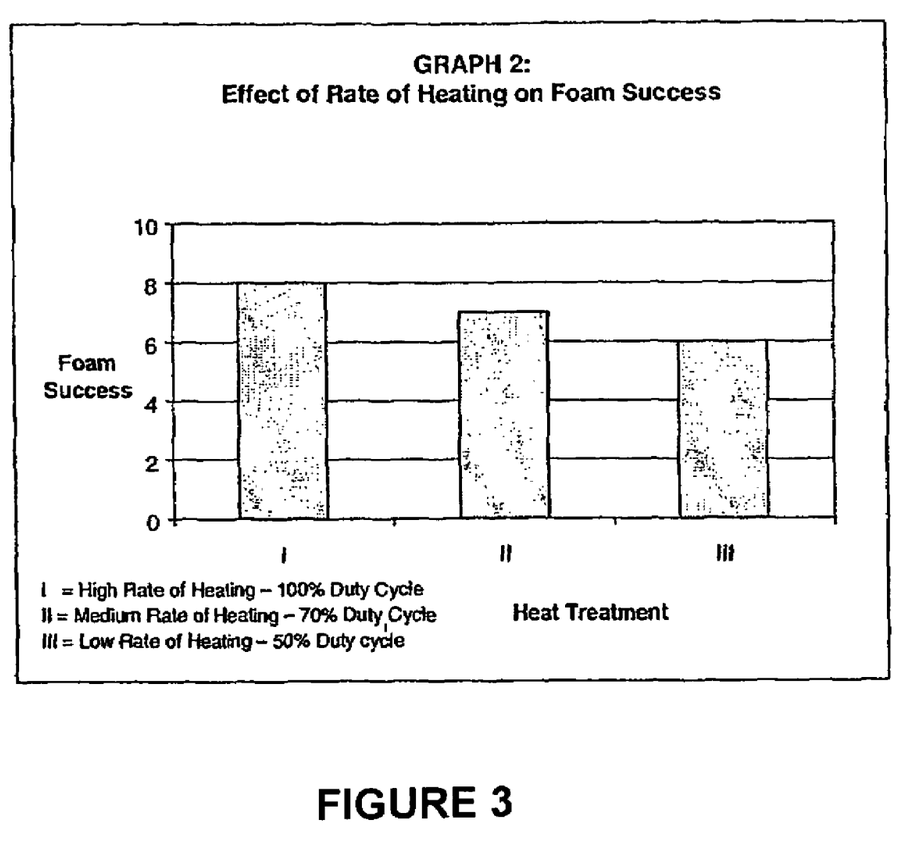
FIG. 3 is a graph showing the relationship between foam success and heat treatment for three different samples.

Three samples are prepared as above and are tested, giving the results shown in FIG. 3.

Where the microwave duty cycle was set at 100% and the rate of heating was the highest (Heat Treatment I on FIG. 3), the foam success was greatest.

Where the microwave duty cycle was set at 50% and the rate of heating was the lowest (Heat Treatment III on FIG. 3), the foam success was lowest.

Where the microwave duty cycle was set at 70% and the rate of heating was intermediate (Heat Treatment II on FIG. 3), the foam success was between that achieved at 100% duty cycle and 50% duty cycle.

In the case of the present invention, it is understood by the applicant that the foam formation involves the nucleation and growth of water vapor bubbles as the result of rapid heating.

EXAMPLE 3

The mold as prepared above is placed into a microwave field (6) using 2.45 GHz frequency microwave energy with a variable power output from 100 W to 5 kW, for the example set to a 2 kW source. The duty cycle of the microwave is 100%.

During the pre-heat stage of the preferred embodiment, the extrudate (5) is pre-heated for less than 30 seconds depending on the tuning of the microwave generator to bring the extrudate (5) to just below the flash point of the water blowing agent. The magnetron (not shown) is adjusted to a power density of 0.83 W/cc whence it is used to heat the extrudate (5) in the mold (6) for less than 30 seconds depending on the tuning of the microwave equipment (not shown). This produces a uniform, resilient, molded foam block (7).

Re-tuning the magnetron if necessary allows for changing dielectric properties in the extrudate as the temperature changes. Better power densities and more accurate density profiles can thus be achieved. While re-tuning is carried out the frequency remains approximately around 2.45 GHz. A temperature profile is shown for the example in FIG. 4.

Figure 4:
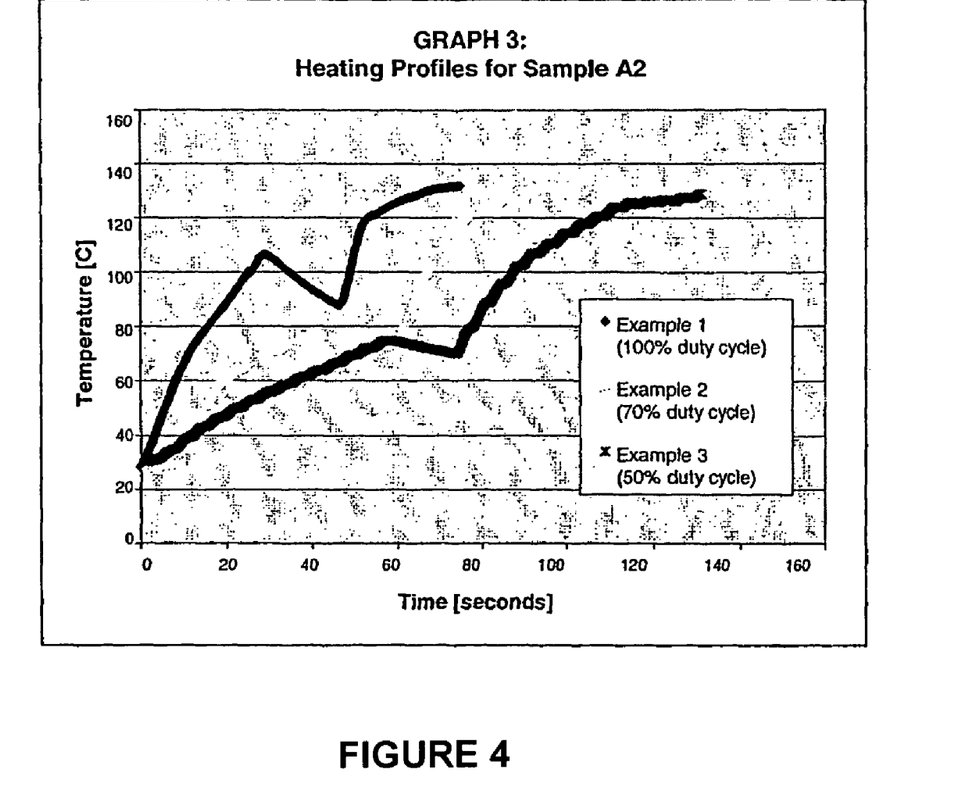
FIG. 4 is a graph showing the relationship between temperature in the foaming material and time for different heat treatments.

The result of heating at 100% duty cycle is foam success of 8, shown in FIG. 3 (shown as heat treatment I on FIGS. 3 and 4). Foam success is measured based on the characteristics of successful packaging foams. These include density, compressibility, resiliency and particle adhesion but it is the combination of these properties that ultimately determines the functionality of the foam.

EXAMPLE 4

In a fourth example the same base material, A2 is put through the same steps (1) to (5) described above. During steps (6) and (7) the microwave duty cycle is changed from 100% in example 1, to 70%. Accordingly, the length of time for each step is also varied to account for the altered heating profile. FIG. 4 shows the resulting heating profile and FIG. 3 shows the resulting foam success is 7 (shown as heat treatment II in FIGS. 3 and 4).

EXAMPLE 5

In a fifth example the same base material, A2 is put through the same steps as Example 2 above however a microwave duty cycle 50% is used. The length of time for each step is again varied to account for the altered heating profile. FIG. 4 shows the resulting heating profile and FIG. 3 shows the resulting foam success is 6 (shown as heat treatment III in FIGS. 3 and 4).

EXAMPLE 6

Figure 5:
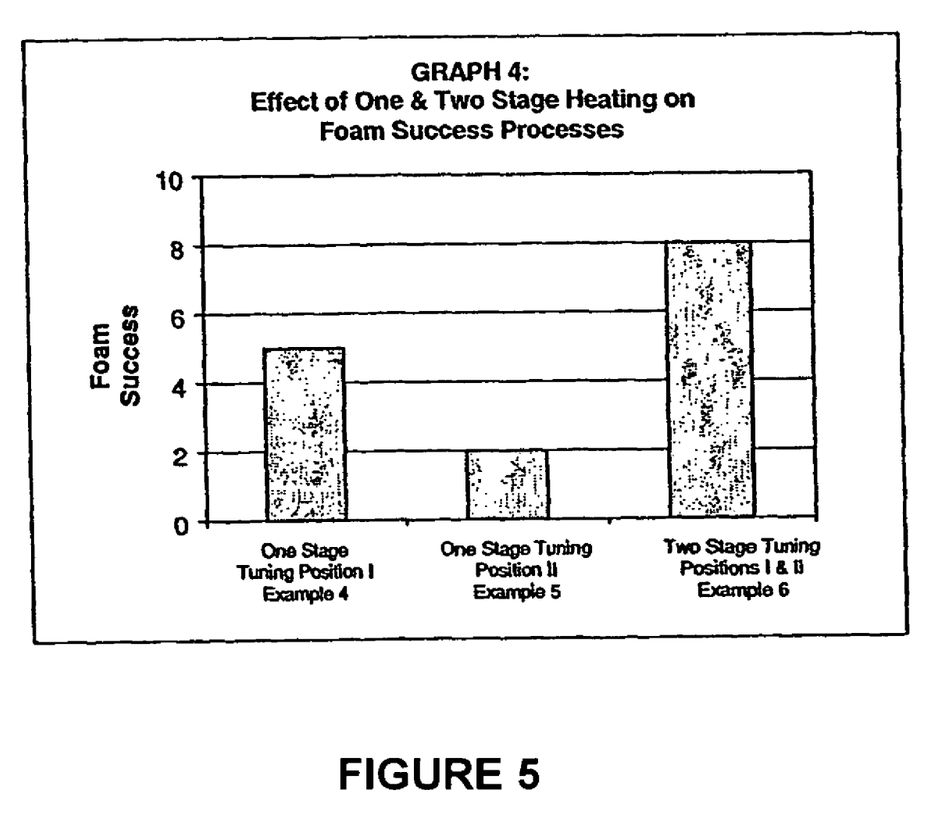
FIG. 5 is a graph showing the relationship between foam success and heat treatment for three different samples.

In a sixth example the same base material, A2 is put through the same steps (1) to (5) described in Example 1. During steps (6) and (7) the microwave duty cycle is held at 100% and the foaming success is tested with a 60 second single step process with the magnetron tuned to the material at the beginning of the microwave process. The foam success result of 5 is shown in FIG. 5 (shown as heat treatment A in FIG. 5).

EXAMPLE 7

In a seventh example the same base material is processed as per Example 6 above, except that during steps (6) and (7) the foaming success is tested. This is done with a 60 second single step process wherein the magnetron is tuned to the material at the normal tuning used when moving through the flash temperature of the blowing agent. The foam success result of 2 is shown in FIG. 5 (shown as heat treatment B in FIG. 5).

EXAMPLE 8

In a eighth example the same base material is processed as per Example 6 above except that during steps (6) and (7) the foaming success is tested with two 30 second steps wherein the magnetron is re-tuned to the material at the end of each step. The foam success result of 8 is shown in FIG. 5 (shown as heat treatment C in FIG. 5).

While a particular embodiment of the Method for the Production of Biodegradable Foamed Products has been described herein, it will be appreciated by those skilled in the art that changes and modifications may be made thereto without departing from the invention in its broader aspects and as set forth in the following claims.

The invention claimed is:
1. A method of producing a thick-walled biodegradable foamed product, the method comprising the steps of:
 a) extruding a starch-based biodegradable polymeric base material containing water as a blowing agent, at a temperature below the flash point of water and with a level of shear which causes only medium levels of macromolecular degradation of the composition, to obtain a product with a water content of between 20% and 50%;
 b) conditioning the extrudate of step (a) at a controlled temperature and humidity to obtain a conditioned extrudate with a moisture content between 5% and 20%, wherein the moisture content of the conditioned extrudate is less than that of extrudate of step a) and with viscoelastic properties which are high enough to prevent rupture of the extrudate during heating and low enough to prevent shrinkage post heating;
 c) transferring the conditioned extrudate of step b to a mold; and
 d) heating the conditioned extrudate of step b using microwaves from a microwave heating device producing microwaves at a frequency of 2450 MHz characterized by the steps of:
  i) preheating by applying said microwaves in a first heating step to the conditioned extrudate in the device of step d to a temperature immediately below the flash point of the blowing agent to achieve uniform temperature distribution throughout the extrudate;
  ii) and then in a second heating step different from said first heating step and after achieving said uniform temperature distribution throughout the extrudate, by controlled rapid heating of the preheated conditioned extrudate of step d(i) by applying said microwaves in the device of step d through the flash point of the blowing agent;
 thereby forming an expanded foam product with a uniform closed cell structure, a medium density and resilient properties.

2. The method of claim 1, wherein microwave heating in step (d) is effected by one or more microwave generators.

3. The method of claim 1, wherein more than one microwave generator is used in step (d), and the microwave generators are tuned to a frequency selected from the group consisting of: all generators at the same frequency, all generators at different frequencies, and combinations thereof.

4. The method of claim 1, wherein the starches are selected from the group consisting of: cereal, root, tuber, modified starches any combination thereof.

5. The method of claim 1, wherein the base material is tapioca starch.

6. The method of claim 1, wherein at least one additive is included with the base material selected from the group consisting of: plasticizers, nucleating agents, strength adjusting agents, viscosity modifiers, adhesion promoters, processing aids, fillers and any combination thereof.

7. The method of claim 6, wherein the plasticizer is polyvinyl alcohol.

8. The method of claim 6, wherein the nucleating agent is magnesium silicate.

9. The method of claim 1, wherein at least one additive is included with the base material selected from the group consisting of: other non-water blowing agents, flame retardant agents, anti-fungal agents, mold inhibitors, and any combination thereof.

10. The method of claim 1, wherein the extrudate in step (b) is conditioned at a controlled temperature range of 15 C to 40 C—and a relative humidity between 25% and 80% to obtain a conditioned extrudate with a moisture content between 12% and 16%.

11. The method of claim 1, wherein the conditioned extrudate in step (b) has a maximum moisture content of 16%.

* * * * *